US007239689B2

(12) United States Patent
Diomelli

(10) Patent No.: US 7,239,689 B2
(45) Date of Patent: Jul. 3, 2007

(54) APPARATUS AND METHOD FOR INTEGRATING PHONE COMMUNICATIONS AND DATA TRANSMISSION ON LANS AND FOR AUTOMATICALLY SELECTING LOWEST-PRICES CARRIER AND CONNECTION MODE

(75) Inventor: Giuseppe Diomelli, Pontedera (IT)

(73) Assignee: C.D.C. S.r.l., Fornacette di Calcinaia (Pisa) (IT)

( * ) Notice: Subject to any disclaimer, the term of this patent is extended or adjusted under 35 U.S.C. 154(b) by 644 days.

(21) Appl. No.: 10/416,445

(22) PCT Filed: Nov. 13, 2001

(86) PCT No.: PCT/EP01/13180

§ 371 (c)(1),
(2), (4) Date: May 12, 2003

(87) PCT Pub. No.: WO02/41571

PCT Pub. Date: May 23, 2002

(65) Prior Publication Data

US 2004/0023687 A1 Feb. 5, 2004

(30) Foreign Application Priority Data

| Nov. 16, 2000 | (IT) | ............................ PI2000A0075 |
| Dec. 15, 2000 | (IT) | ............................ PI2000A0081 |
| May 14, 2001 | (IT) | ............................ PI2001A0039 |

(51) Int. Cl.
*H04M 15/00* (2006.01)

(52) U.S. Cl. ............................ 379/114.02; 379/114.08; 370/352; 370/356

(58) Field of Classification Search ............ 379/114.02, 379/114.03, 114.06, 121.01, 114.08; 370/352–357, 370/466–467; 455/406–408
See application file for complete search history.

(56) References Cited

U.S. PATENT DOCUMENTS

| 5,862,203 | A | * | 1/1999 | Wulkan et al. | ......... 379/114.02 |
| 6,075,784 | A | * | 6/2000 | Frankel et al. | ............... 370/356 |
| 6,141,411 | A | * | 10/2000 | Robinson et al. | ...... 379/221.01 |
| 6,307,853 | B1 | | 10/2001 | Antonio et al. | |
| 6,639,913 | B1 | * | 10/2003 | Frankel et al. | ............... 370/356 |

FOREIGN PATENT DOCUMENTS

| JP | 03/045053 | 2/1991 |
| WO | WO 01/52476 | 7/2001 |
| WO | WO 02/415571 | 5/2002 |

* cited by examiner

*Primary Examiner*—Binh K. Tieu
(74) *Attorney, Agent, or Firm*—Roylance, Abrams, Berdo & Goodman, LLP

(57) ABSTRACT

A apparatus for the integration of phone communications and IT data transmissions through a LAN provides central equipment and peripheral devices of said local area network comprising means, hardware and software, for the analogue/digital and digital/analogue conversion of phone signals into data packets and vice-versa, for the detection of data packets referring to phone communications, for the priority transmission of said data packets to the addressed phone sets, for the automatic transfer of phone communications from public phone network to LAN phone users and vice-versa, for the integrated management of messages having a multimedia content, for the performance of typical functions of an exchange and further, for the automatic selection of the most inexpensive telecommunication carrier and telephone connection mode as a function of phone service cost parameters and statistic parameters referring to the use of telephone services by each LAN phone user.

18 Claims, 9 Drawing Sheets

APPARATUS AND METHOD FOR INTEGRATING PHONE COMMUNICATIONS AND DATA TRANSMISSION ON LANS AND FOR AUTOMATICALLY SELECTING LOWEST-PRICES CARRIER AND CONNECTION MODE

DESCRIPTION

1. Field of the Invention

This invention relates to an apparatus for integrating phone communication and data transmission on local area computer networks (LANs) and for automatically selecting the telecommunication carrier and the connection mode which better match specific requirements and, in particular, economy criteria.

The invention also relates to a method for integrating phone communication and data transmission on LANs and for automatically selecting the most inexpensive connection mode (fixed/fixed, fixed/mobile, mobile/mobile) and telecommunication carrier.

2. Description of the Prior Art

It is now widely spread the technique of exchanging data, information and messages within companies or offices, using computers connected to each other by means of transmission lines operating at high transfer speed according to standardized transmission protocols.

The above lines, which constitute a LAN, operate parallel with the traditional internal corporate telephone system managed by means of private exchange.

The technical features of the two networks above, LAN and telephone system, substantially differ, as known, in the fact that while data transmitted through the IT system connection network are exclusively of digital type, signals through the phone system are essentially analogue.

After the liberalization of the telecommunication service carrying through public telephone networks, each fixed telephony user is now allowed choosing to call using the service offered by different carriers previously entered into a supply contract. Said user makes the choice by adding, upon calling, a specific code before the phone number to dial, which code corresponds to the specific selected carrier. The selection criterion of carrier is, in general, a criterion based on the service inexpensiveness.

Each supplier, in fact, submits his own scale of charges of the several services offered and they generally include some services being advantageous in respect of the other carriers' offer. For instance, in a given period of time over the day, or week, costs for tong-distance calls made by means of a given carrier may be sensibly cheaper than those of the same calls made through other carriers, or international calls, or calls to mobile phone, or communications for message and data transmission, or town calls having certain length, and so on, may be more profitable.

In addition, in case calls are towards mobile phone, the communication cost can be very inexpensive if made through a mobile phone whose SIM card is managed by the same phone communication carrier who manages the SIM card of the receiving phone.

Therefore, as the number of carriers increases, it becomes more and more difficult to the user to make an inexpensive choice both as to the telecommunication service carrier and the type of connection.

In consideration of the above and considering also that LANs with client/server architecture are more and more spread even as regards small companies using low power computers, and knowing, finally, new potentialities offered by the IT sector, it is perceived the opportunity to develop a solution allowing both a simplification of systems, especially in the case of new areas or buildings, and an increase in performances and features of flexibility in respect of the traditional exchanges, and allowing further the automatic selection of carrier and connection modes upon each phone connection between LAN phone user and external network.

SUMMARY OF THE INVENTION

The primary object of the present invention is to provide an apparatus, and corresponding method, for the integration of phone communications, multimedia messages and IT data transmission through a LAN, said apparatus being suited to directly connect to the public telephone network and automatically carry out activities currently performed by exchange operators.

Another object is to provide an apparatus and a corresponding method to obtain, upon the connection of a fixed telephone to the public phone network, the automatic selection of the telecommunication service carrier, said selection being based on maximum economic advantage criteria, and said telecommunication services being referred to telephone services and data and message transmission services through the public phone networks.

Further object of this invention is to provide an apparatus and corresponding method to put into practice, upon phone connection of a fixed telephone to mobile receivers, an automatic changing of the connection mode, from fixed/mobile to mobile/mobile, in case it results economically advantageous.

Another object of the invention is to provide an apparatus and corresponding method through which it is allowed to create automatically files of data referring to the use of telecommunication services through telephone systems by the users of such services and to recover such data also to select the more inexpensive telecommunication carrier for phone services required in a given moment.

These and other objects and adavantages are obtained by an apparatus for integrating phone communications and IT data transmissions through a LAN and for selecting, at the moment of connecting one fixed telephone of said LAN to the public phone network, the lowest-price telecommunication carrier and connection mode, comprising:

at least one electronic equipment, and related software, which, associated with the central processing unit of said LAN, provides managing the transmission, through the LAN, of both data packets exchanged among the various IT systems of the LAN and data packets referring to phone commuications exchanged among the LAN users and among said users and the external telephone network users, and provides furthermore, at the moment of a call starting from a LAN user, automatically selecting the most inexpensive carrier of the requested telecommunication services and the most inexpensive connection mode between the telephone of said user and the external telephone network said selection being done according to speific parameters of said user and cost parameters of said services;

one ore more peripheral devices that provide converting said data packets referring to phone communications into phone signals and sending said phone signals to telephones, faxes, and other phone sets connected to said peripheral devices and also provide, viceversa, converting phone signals coming from said telephones, faxes or phone receivers into data packets compatible with the transmitting protocol of said LAN and sending said data-packets toward said central electronic equipment.

The above electronic equipment, associated with the LAN central processing unit commonly denominated as LAN server, comprises:
means for interfacing public telephone network, decadic or multifrequency telephones and terminal devices dedicated to phone operators;
means for switching ext telephone lines toward said telephones or toward A/D converters, said switching means being automatically controlled according to decoding operations performed on destination telephone numbers of incoming calls;
means for storing telephone-answer messages;
means for priority management of data packets referring to phone communications on said LAN;
means for creating files of data concerning phone communications through said LAN;
means for storing and processing statistic parameters concerning use of telecommunication services by each single telephone connected to peripheral devices of said LAN;
means for the acquisition of cost parameters of telecommunication services;
means for connecting to external mobile phones and cordless phones associated with LAN telephones;

said equipment being enable to perform all typical functions of a private exchange, such as the reception of call by local operators, automatic switching of incoming and outgoing phone calls, transmission of hold-on or answer-telephone messages or other similar functions.

The peripheral devices of the apparatus of the invention comprise:
means for converting phone signals coming from in-LAN telephones, faxes or receivers into data compatible with the transmitting protocol of said LAN, and viceversa;
means for switching digital data packets coming on the LAN-bus to telephones, faxes and client peripheral computers, connected to said peripheral devices;
means for decoding the address of said digital data packets;
means for detecting the receiver pickup or, anyway, the enabling of said in-LAN telephones, faxes or receivers.

Advantageously, said peripheral devices include d.c. power supplies automatically rechargeable from the a.c. power supply network; in addition, the above-mentioned means for converting, switching, decoding and detecting, comprised in said peripheral devices are made by hard-wired logic circuits or microprocessor units provided with specific software functions.

The electronic equipment associated with the LAN server provides to select the carrier of telecommunication services requested by a user of said LAN determining, by detecting and interpreting the digits of the telephone number that the user is calling, the kind of call desired (town, long-distance, international, to mobile phone . . . ) and, therefore, selecting the most inexpensive telecommunication carrier according to the type of communication, time of communication, hour cost parameter of such communication and according to user typical parameters specifying the statistically supposed length of said communication. The electronic equipment also provides to automatically dial the identification code of the selected telecommunication carrier before the telephone number under dialling.

The above equipment, upon the telephone connection of LAN telephones to mobile phones external to said LAN, automatically switches, if cheaper, the type of phone connection, from "fixed to mobile" to "mobile to mobile", using connection means towards the mobile phone network (PLMN) directly included in said equipment or in connected equipments, said connection means operating by means of SIM cards managed by the same mobile phone service carrier who manages the SIM card of the called mobile phone, or by other carrier, if cheaper. Therefore, in this case, the phone call takes place, through the PLMN, between the central electronic equipment of the invention and the external mobile telephone, and, through the LAN, between said central electronic equipment and the local area network telephone.

Parameters used in the selection of carrier and phone connection type are acquired, processed and stored in said central electronic equipment; and parameters are systematically updated according to preset time intervals by means of both the processing of statistic data referring to the use of telecommunication services by each phone user managed by the invention apparatus and the acquisition of data referring to the cost of telecommunication services offered by the various carrier.

The processing of data referring to telecommunication services used by each one of phone users produces different typologies of typical statistic parameters for said users: a first typology refers to average duration of calls made by the single user in the different moments of the day and/or during the several days of the week or month; a second type refers to the global volume of the telephone traffic going out from said user in a specific period of time; a third typology refers to the characteristics of the telephone traffic reaching each single user.

The processing of data referring to the use of phone services and the acquisition of data referring to the cost of such services may be performed by separted processing units connected to the public telephone network by means of communication networks such as the Internet, or the like; said separated units periodically connect to the central electronic equipment of the invention to transmit useful parameters for the selection of lowest-prices carrier and connection mode.

A method for integrating phone calls and data transmission through a single LAN and for selecting the lowest-prices connection mode and telecommunication carrier, comprises the steps of:
detecting phone communications through the local area network (LAN), said communication coming from the public telephone network or from fixed phone instruments of said LAN;
converting said phone communications into digital data packets provided with proper addressing,
priority transmitting said data packets through the LAN;
acquiring said data packets by the central equipment of said LAN or by peripheral devices associated with the destination telephone sets;
converting said data packets into phone signals;
transmitting said phone signals to destination telephone sets or to public phone network, and, in case the communication originates from telephones of the local area network and is addressed to the public network:
detecting and collecting data referring to the use of telecommunication services (such as the type of call, town/long-distance/international, the time of call, its duration . . . ) by each user, so that, by means of periodical processing activities of said data for calculating use statistic parameters aiming at outlining said users, and by means of periodical acquisitions and storing of cost parameters of the telecommunication services offered by the several carriers, it occurs, upon each call from LAN phones toward public network,:

- detection of digits constituting the telephone number addressed by said call;
- determination, as a function of said digits, of the type of the telecommunication service that user is requesting;
- selection, as a function of the above statistic parameters and above cost parameters, of the lowest-prices telecommunication carrier and connection mode for carrying out the telecommunication service requested by the user;
- automatic dialling of the identification code of said carrier before the telephone number of said call and, according to the telephone connection mode selected in accordance with the previous step, the transmission of said call by means of fixed phones or mobile phones.

The above mentioned use statistic parameters, outlining the various users, employed to automatically select telecommunication carrier and connection mode, are advantageously of three types, as follows:

- a first typology of parameters refers to the average duration of calls made by each fixed phone user in the several periods of the day and/or in the several days of the week or month;
- a second typology concerns the global volume of the telephone traffic being possibly subdivided as a function of the call destinations;
- a third typology refers to the characteristics of the telephone traffic reaching each single phone user.

In case a fixed telephone controlled by the invention apparatus gets a phone call by mobile telephones, an embodiment of the method according to the invention also provides for:

- detecting the caller's telephone number;
- checking the inclusion of said number in a determined list of numbers; and, if so:
- storing said number,
- refusing the incoming phone call,
- calling said telephone number using, according to the inexpensiveness, fixed phones or mobile phones comprising SIM identification cards managed by the same mobile service carrier who manages the identification card of the mobile phone receiving the call.

In case the addressed telephone number of a communication reaching said LAN from the external telephone network does not include any LAN user number, the communication is managed by interactive terminal operators of the central electronic equipment managing the LAN; said operators, using the new potentialities of the apparatus of the invention, can, if need, write in real time e-mail messages, give the communication multimedia contents, record voice messages, forward communications to the LAN users or perform other operations. Alternatively, said communication may be switched towards a telephone set connected to said elctronic equipmente, without converting it into digital form, the conversion being clearly performed if the communication itself is subsequently forwarded to a specific user of the LAN.

The operations described in the above-mentioned steps of the method of this invention are carried out in an automatic way.

Furthermore, according to the invention method, the transmission of data packets referring to phone communications and the automatic selection of carrier may be managed by the same unit (server) that manages the IT data transmission from and to the serval LAN processing units (client) or towards other peripheral devices of the LAN, and that the conversion of phone signals into digital data and vice-versa can be performed by such peripheral devices and such central equipment. In such a way, it is allowed using, even for telephone commmunications, great many of equipments and instruments used for the It data processing.

The use of the apparatus and corresponding method of invention determines, nevertheless, undoubted advatages as to both the simplification of global phone services management for the LAN users and the reduction in the costs of services themslves, thanks to the automatic selection of carrier offering the lowest-prices telecommunication services suitable to the specific user profiles.

Another general adavantage descends by the fact that it is not necessary to provide for new systems any time that a new phone user has to be added in the It network area; in fact, said user may directly result form one of the LAN peripheral devices.

Other important advantages come out of the high and easy expansion capacity of the local transmission network and of the flexible use of voice functions and multimedia messages in general, which may be exchanged in an interactive way.

BRIEF DESCRIPTION OF THE DRAWINGS

However, for a better understanding of the above-mentioned advantages and characteristics of the present invention, this will be now described by way of an embodiment example, with reference to the attached drawings, in which.

DESCRIPTION OF PREFERRED EMBODIMENTS

Figure 1:
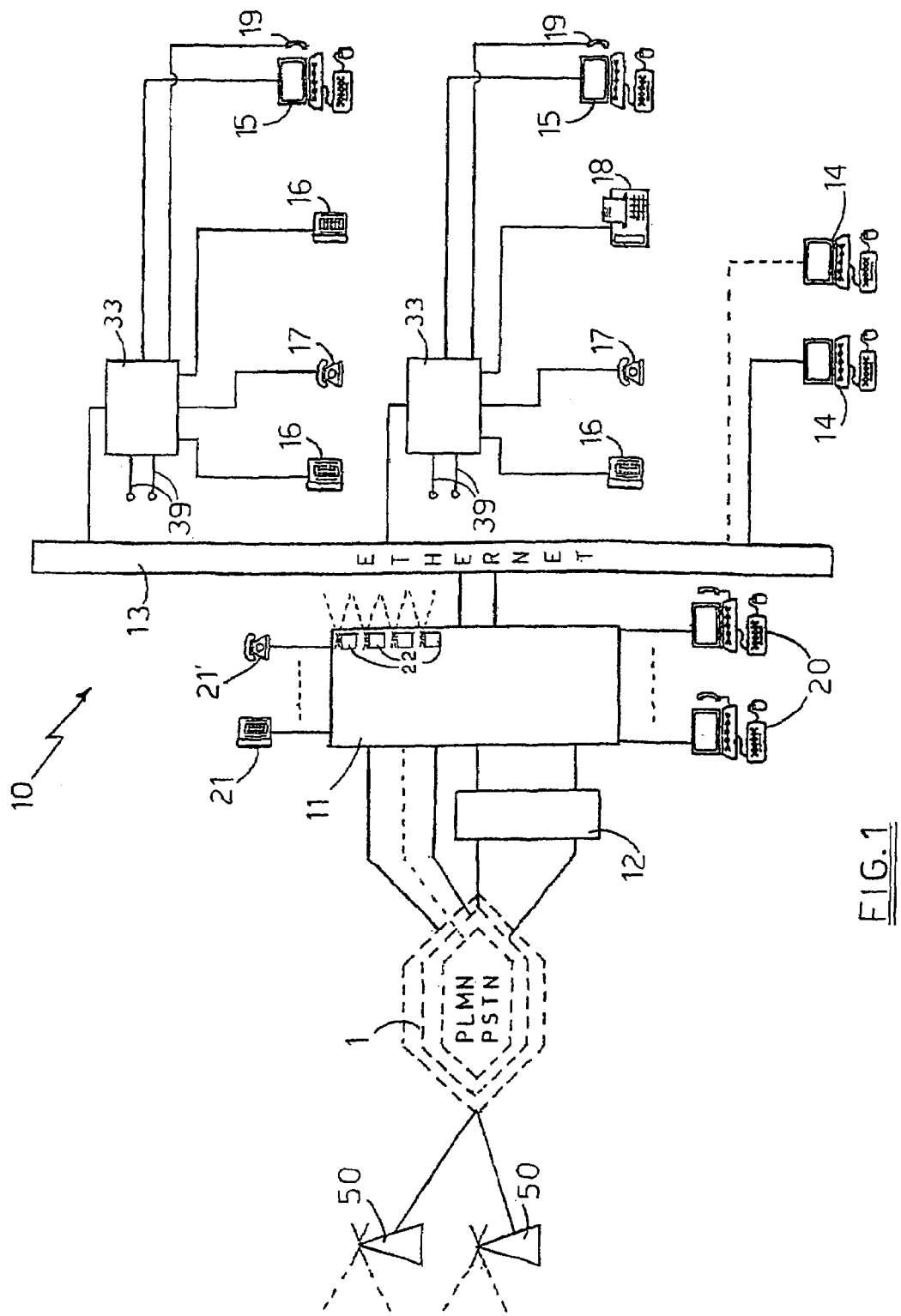
FIG. 1 shows a schematic view of a LAN including an apparatus according to this invention.

Referring first to the embodiment of FIG. 1, it is very schematically shown a whole, 1, of phone networks interacting each other, be them fixed networks PSTN (Public Switching Telephone Network) or mobile networks PLMN (Public Land Mobile Network).

The above whole, 1, is connected to a local area network (LAN), 10, made up of telephones and IT equipments and instruments.

In particular we note an electronic equipment, 11, which is linked to the public telephone network, 1, both directly and by a transcoder of phone signals into digital data and vice-versa, 12.

Said electronic equipment, 11, which will be described in details later on, also constitutes the so-called network server that, as known, manages the exchange of IT data among all LAN units connected to each other by means of a single telematic line, 13. In this embodiment, the communication through the above line responds to the Ethernet protocol and the transmission speed is 10 Mbit/sec but can advantageously reach the value of 100 Mbit/sec or higher.

Several peripheral units are connected to the LAN, 10; in particular, two traditional-type (client) computers, 14, provided with video terminal and alphanumerical keyboard are directly connected to the telematic line 13 and two other (client) computers, 15, further provided with phone receiver, 19, are connected to the telematic line, 13, through peripheral devices, 33.

Figure 3:
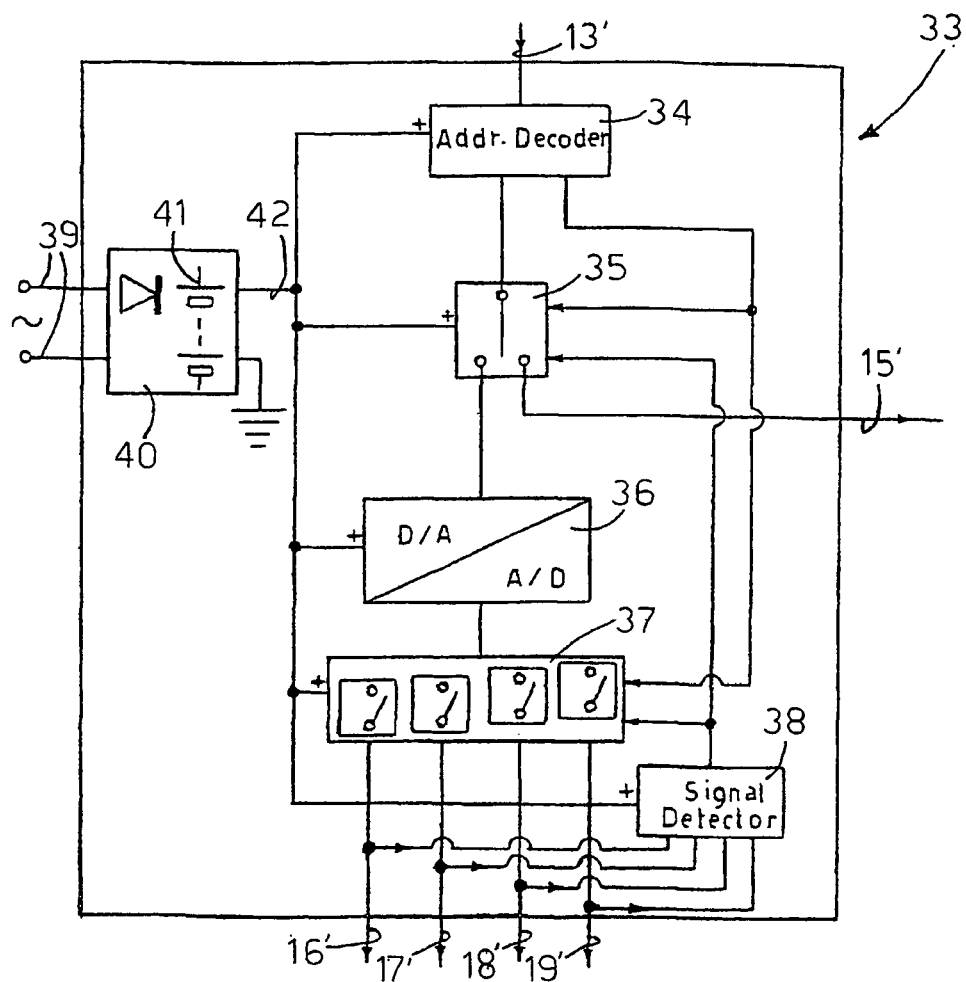
FIG. 3 shows a block diagram of another component of the apparatus of FIG. 1.

Said devices, 33, have the function of interfacing the LAN bus to the client computers, 15, the various telephones, 16 and 17, faxes, 18, receivers, 19, associated with client computers by software, or any other possible telephone sets. As shown in FIG. 3, these devices include:
- a section, 34, for decoding the addresses of the several data packets going through line 13;
- a logic switch section, 35;
- a digital/analogue and analogue/digital converter section, 36;
- a switching section, 37;
- a section, 38, for detecting the on/off status of telephone sets 16, 17, 18, 19, connected to device 33.

The above devices, 33, are provided with inputs, 39, for feeding from the a.c. power supply network, they also provide connection lines, 13', 16', 17', 18', 19', 15', to the Ethernet, 13, telephone sets and the above client computers, respectively.

In particular, input terminals, 39, refer to an inner d.c. power supply, 40, which is equipped with a battery, 41, that provides terminal 42 with constant voltage power supply for enough long times, in order to make up for any lack of the a.c. network.

Going back to the diagram of FIG. 1, we can see that operative terminals 20, which are similar to client computers 15, are connected to the central electronic equipment 11. Also telephone sets, 21, 21', are connected to said equipment These telephones are useful for the performance of traditional exchanges typical functions and for further functions relating to the management of phone communications exchanged between local area network and public network.

Equipment 11 comprises also communication means, 22, to the external mobile telephony network (PLMN); about this one, only the terminal radio stations, 50, commonly denominated as BTS (Base Transmitting Station), are shown in the figure by reason of drawing simplicity. Communication means, 22, are comprised in a device, 32, belonging to said equipment 11. Device 32 also comprises a specific electronic circuitry designed to enable the above-mentioned communications means, 22, which are practically made up of mobile phones with no interface to the user, such as keyboards or displays, but comprising PLMN receiving and transmitting units based on SIM identification cards of the several carriers of mobile telephone networks. Communication means, 22, comprise also cordless phone sets associated to LAN phone sets 16, 17.

Figure 2:
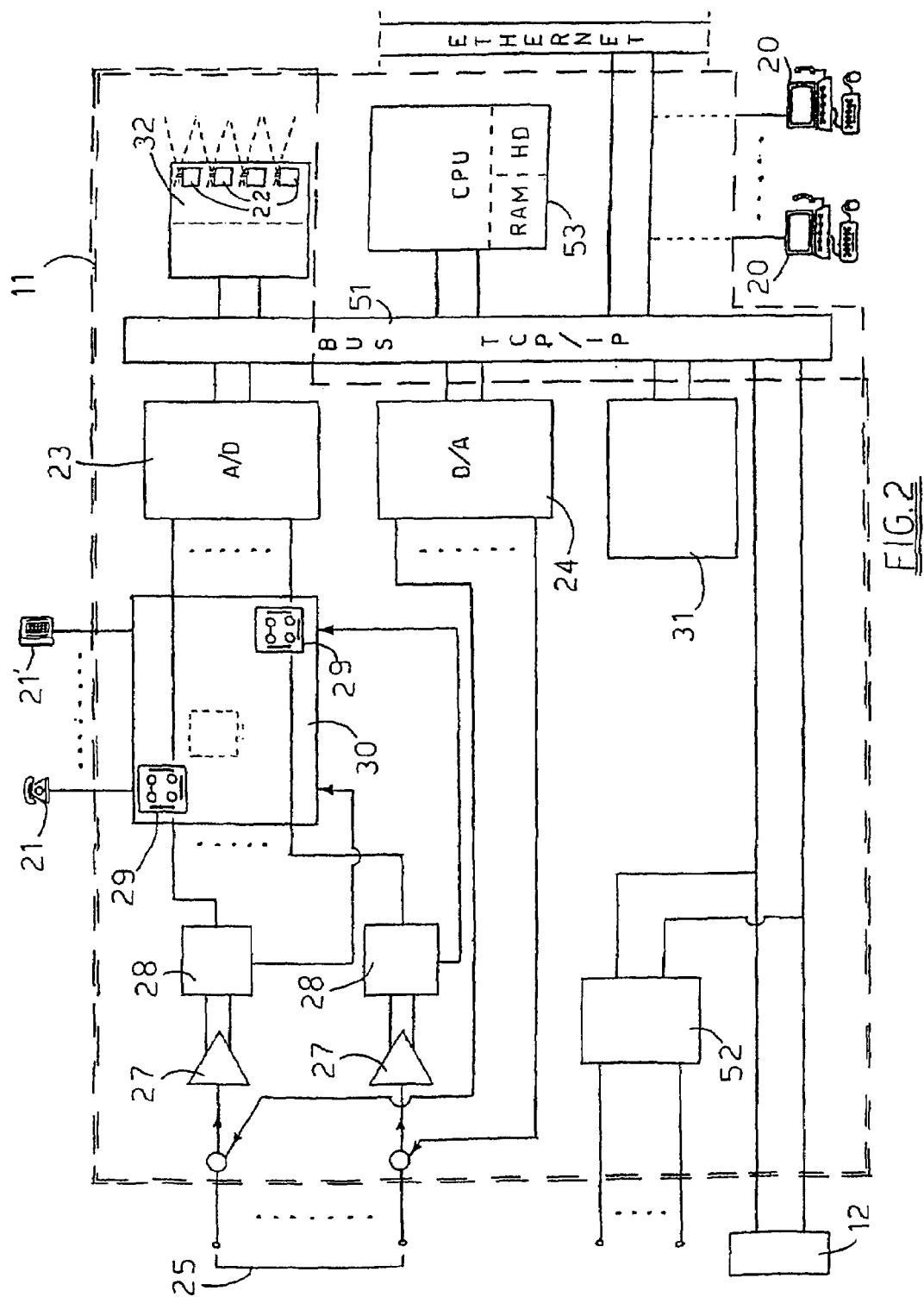
FIG. 2 shows a block diagram of a component of the apparatus of FIG. 1.

In FIG. 2, which shows a detailed block-diagram of said central equipment 11, we can note that it comprises analogue/digital and digital/analogue converters, marked with 23 and 24 respectively, placed between the internal bus, 51, and the lines, 25, directly connected to the external and/or public telephony network, 1.

Possible digital-type lines, ISDN or similar ones, are connected to an adapter, 52, enable to make the format of data transmitted through such lines suitable to the internal transmitting protocol of the local network 10.

Other lines of the external and/or public telephone network can be connected, as shown in FIG. 1, to the local area network 10 by means of devices 12 that convert phone signals into digital data and vice-versa. The output of said converter 12 is connected, as shown in FIG. 2, to the internal bus, 51, of the central electronic equipment 11.

Each one of the external lines, 25, includes amplification and separation means, 27, and decoding means, 28, of the telephone number of the incoming call; switches, 29, of a switching unit, 30, controlled according to the results of the decoding operations performed by said decoding means, are dedicated to send the incoming phone communications to the operative terminals 20 and phone users of the LAN or to the telephone sets, 21, connected to said central electronic equipment, 11.

Said switches, 29, can also be directly controlled by the operators of terminals, 20, and telephone sets, 21, both for forwarding communications to the LAN users and making direct calls, among terminals, 20, telephone sets, 21 and 21', and other phone equipments and instruments of the LAN, 10.

It has to be noticed that, by means of terminals 20, the above operators can also interact with the LAN users resorting to the potentialities of the invention apparatus and associated software.

In the block-diagram of FIG. 2 it is shown, furthermore, a unit, 31, which stores answer messages automatically recalled and transmitted to the D/A converter, 24, during call processing algorithms executed by the server CPU, 53, according to specific procedures.

In said figure, a double broken line encloses the electronic equipment that, associated with the central processing unit, makes the latter innovative in respect of a traditional LAN server.

The above described apparatus operates as follows.

Figure 6A:
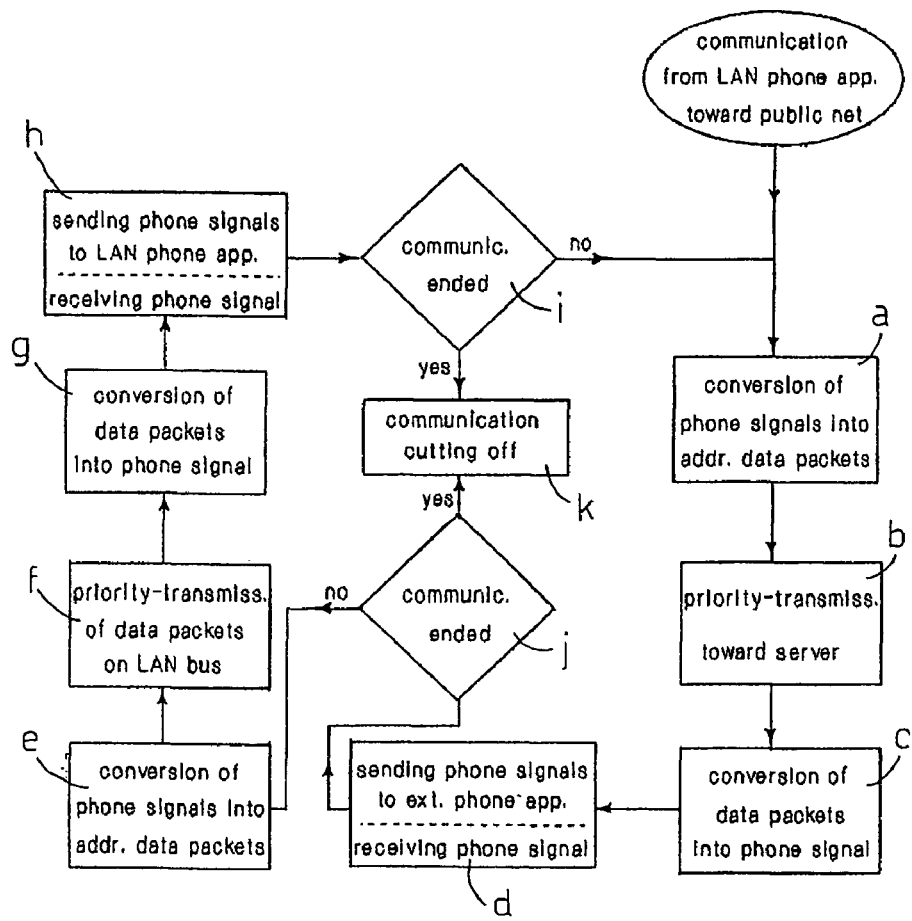
FIGS. 6a and 6b show detailed flowchart relating to some steps of the method of FIG. 5.
Figure 6B:
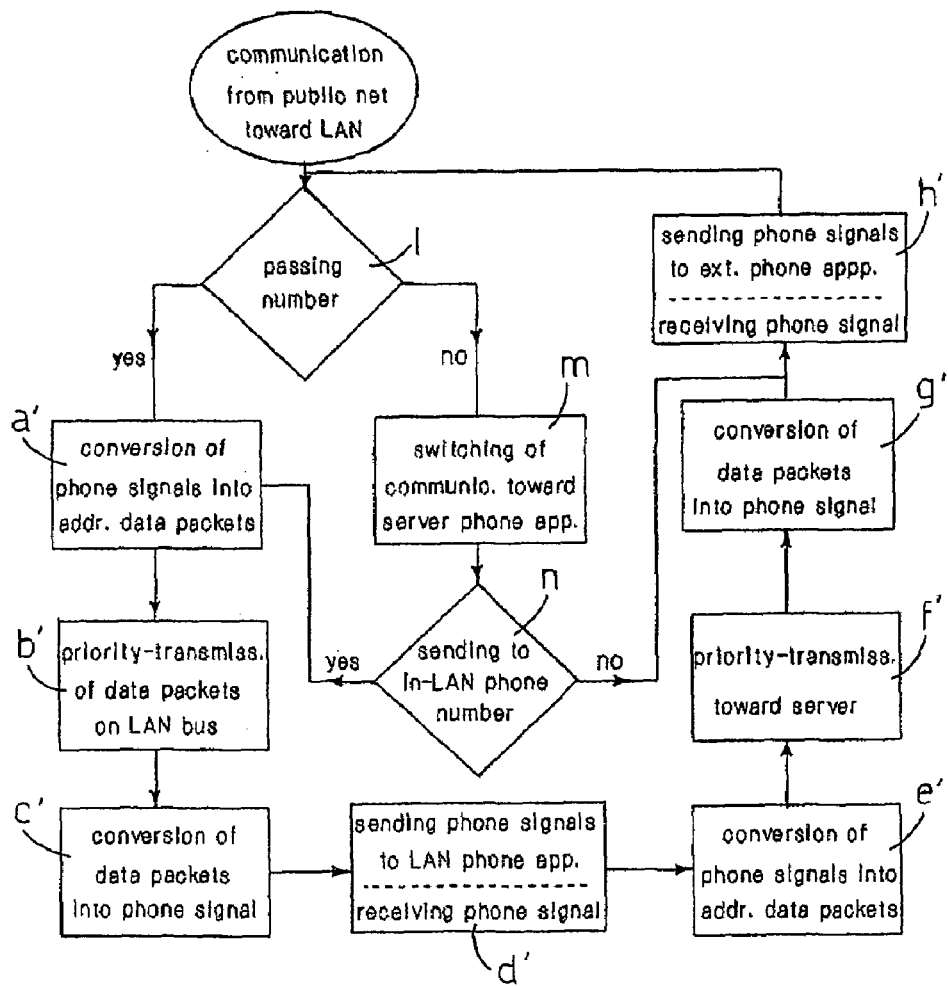

In the detailed flow-charts of FIGS. 6a and 6b, there are shown consecutive operating steps referring, respectively, to the case of a communication starting from a LAN phone set and directed toward a telephone connected to the public network (FIG. 6a), and to the case of a communication reaching the LAN, 10, from an ext. telephone (FIG. 6b).

In case that a communication starts from a LAN phone user, the peripheral device, 33, whereto said user is connected, provides converting analog phone signals into digital data packets (step a) and prioritary sending said data toward the LAN server (step b) where the opposite conversion (step c) and the transmission toward the public network (step d) occurs; as soon as the reply phone signals are received, a proper conversion into data packets (step e) and a prioritary transmission toward LAN phone user (step f) take place; the above data packets are then detected by the peripheral device, 33, to which the addressed phone user is connected, said data packets being converted to phone signals (step g) and transmitted to said phone user (step h); as soon as the reply phone signals are received the operating cycle resumes from step a.

It has to be noticed that the reply phone signals reception, both in step d and h, does not occur in case the communication has been interrupted (step i, j, k).

In case that phone communications reache LAN 10 from public network, 1, the involved operating cycle is equal and opposite to thet one above described.

In fact, the relating flow-chart (FIG. 6b) is very similar to that one of FIG. 6a; the sole difference consists in the fact that it is possible a direct or an indirect connection between the ext telephone and the LAN phone user according to the fact that the phone number of the incoming call include, or not, the LAN inner number of said phone user.

In case that a phone call reaching the LAN, 10, from the external telephone network 1, addresses directly a LAN phone user, the communication is promptly converted into digital data packets by converter 12, or 23, (step a') and sent on the telematic line, 13, by priority procedure (step b'); the destination peripheral device, 33, receives the above data packets as it occurs for standard IT data packets, but as soon as their nature is detected by means of proper identification code, said device carries out the conversion of the above data packets into telephone signals (step c') and transmits them to the telephone, fax or receiver associated with it (step d'); then, the reply phone signal is converted into digital form by the peripheral device itself (step e') and transmitted through the Ethernet toward the server (step f') which processes it in a prioritary way to convert the same into phone signals (step g') and send to the external and/or public telephone network (step h').

In case the telephone number of the incoming call from the external telephone network does not include any LAN user number, the communication is managed by the interactive terminal operators 20 who, using the new potentialities of the apparatus of the invention, can, if need, write in real time e-mail messages, give the communication multimedia contents, record voice messages, forward communications to the LAN users or perform other operations.

Alternatively, with the apparatus of this invention it is also possible, as shown in diagram of FIG. 6b, that in case the telephone number of an incoming call from the external telephone network does not include a LAN user number, the communication is switched to one of the telephone sets, 21, connected to the electronic equipment, 11, without converting the content into digital form; instead, the A/D conversion is clearly performed if the communication itself is subsequently forwarded to a specific user of the LAN.

Foer reasons of drawing simplicity, in FIG. 6b there are not shown the steps corresponding to steps i, j, k of FIG. 6a, but obviously, said steps concerning the communication interruption checking are performed also in FIG. 6b procedure.

If a communication reachs the LAN through a digital ISDN, ADSL or similar line, the relating conversion into digital data packets is not done, but the digital format is simply adjusted to the network protocol and vice-versa by means of the adaptor 52.

In case of a phone ccommunication between two internal users of the LAN 10, steps of the procedure executed in such circumstance are only some of those ones above disclosed. These steps are very clear to a skilled man: really, the steps usually needed for the exchange of IT data between two users of a LAN added with the conversion steps of analog phone signals into digital and viceversa.

Referring again to the flow-chart of FIG. 6a, it has to be specified that the shown procedure refers to the case of a phone call originating from one of the LAN users and going directly toward the public network, without involving operators and telephone sets, 21, connected to the equipment, 11.

It has to be noticed, howefer, that in each one of the above cases, the central equipment 11 operates to manage the phone communication in various way by means of specific software procedures stored in the memory units associated with the CPU 53 of the equipment itself, therefore, said central equipment can store specific data referring to the communications for the purpose of further enquiries or issue of statistics reports.

Figure 5:
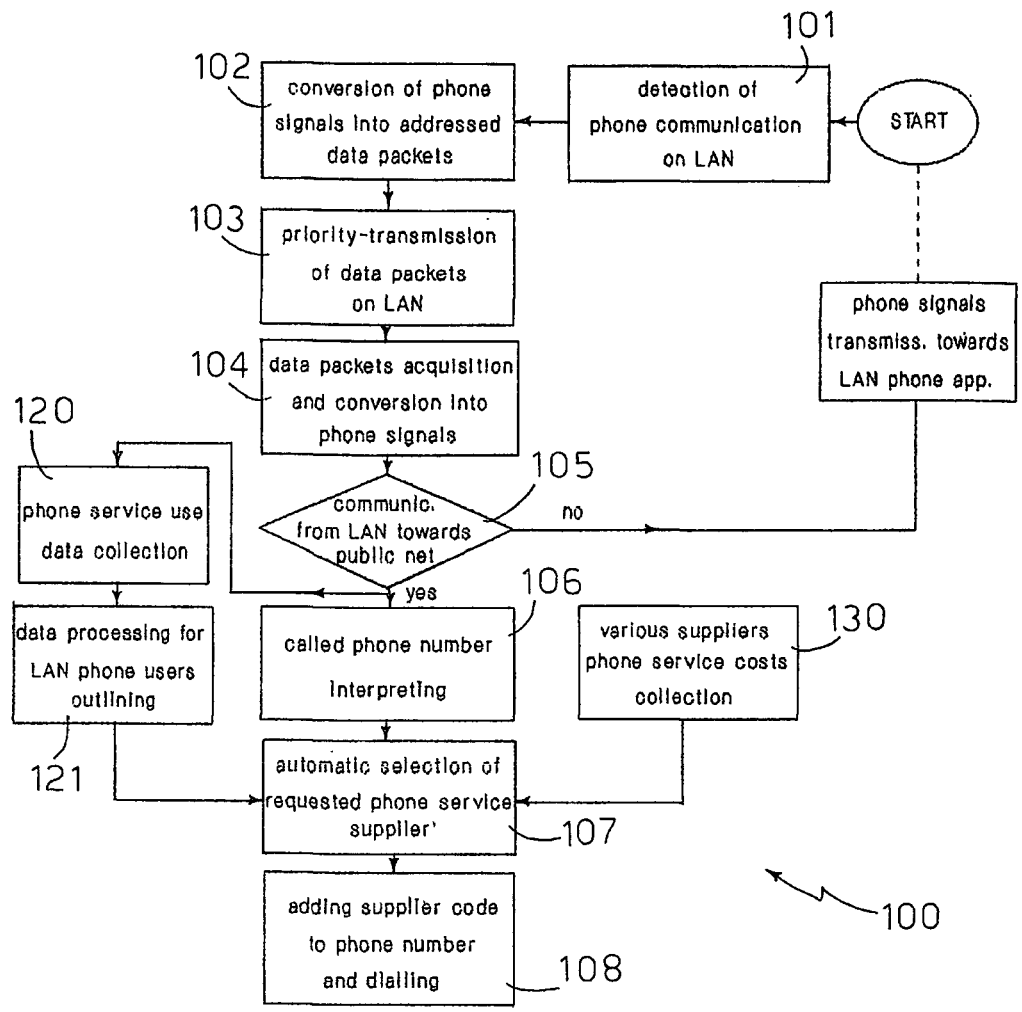
FIG. 5 shows a flowchart of the main steps of a method according to the invention.

In case of phone communications originating from LAN users and going outwards, the storage of the aforesaid data aims, as shown in FIG. 5, at computing statistic parameters defining the specific outline of each user, by correlating the type of communications and the time and length of same communications.

In particular, a first series of said statistic parameters refers to the average length of phone calls made by each user in the different times over the day and/or days of the week or month, while a second series of said parameters refers to the total volume of the phone traffic of each user in a specific period of time, and a third series of said parameters refers to the characteristics of the telephone traffic reaching each single user.

The detection of data concerning the use of phone services and the determination of the user profile, for each one of the LAN phone users, are activities schematically shown in steps 120 and 121 of the global flow-chart, 100, of FIG. 5.

As we can see in this diagram, parallel with the performance of the above-described activities, in the central equipment 11, further data are periodically stored and updated, which data exactly refer to the cost parameters of the telephone service offered by several carriers, step 130.

These cost parameters, together with the statistic data processed by the central equipment, 11, to outline each single phone user, are therefore used to perform the automatic selection of the most inexpensive carrier for each phone communication. Said selection, step 107, is exactly performed as a function of the interpretation or decoding operation, phase 106, carried out on the telephone number under dialling.

In particular, at the moment of a number dialling by means of a LAN telephone equipment or instrument, CPU 53 interprets digits of said number and determiines exactly the type of communication requested; therefore, using the statistic tables stored into the corresponding RAM, the CPU, according to the type of communication and the time of communication, finds out the probable length of said communication; so, by entering tables of cost parameters, also stored into such RAM, it can determine the most inexpensive carrier of the telephone service that the user is requesting (type of communication, supposed length of the same).

As soon as the carrier is selected in the aforesaid mode, the CPU, 53, directly dials and transmits toward the public network the telephone number comprising the identification carrier code, phase 108.

It has to be noticed that phases 101, 102, 103 and 104 of method in FIG. 5 refer to the global maanagement activity of phone communications on the LAN, activity previously described in details with the aid of FIGS. 6a and 6b.

It is clear that the three steps, 120, 121 and 130, are not linked to other steps of the method in a chronological way. In fact, these steps can be performed separately, better in the times of limited or absent telephone traffic.

Upon the installation of a new telephone in network 10, there is a parallel installation, via software, of the new user in the central electronic equipment, 11, and in the corresponding peripheral device, 33, with relevant code and relevant default statistic parameters that have to be already used from the first call made through said telephone.

An interesting operation mode of the apparatus of the present invention refers to calls toward ext. mobile phones and, also, to calls received from well-specified ext. mobile phones. In fact, we have to consider that phone communications between mobile phones managed by the same mobile phone network carrier can be particularly advantageous.

Figure 7:
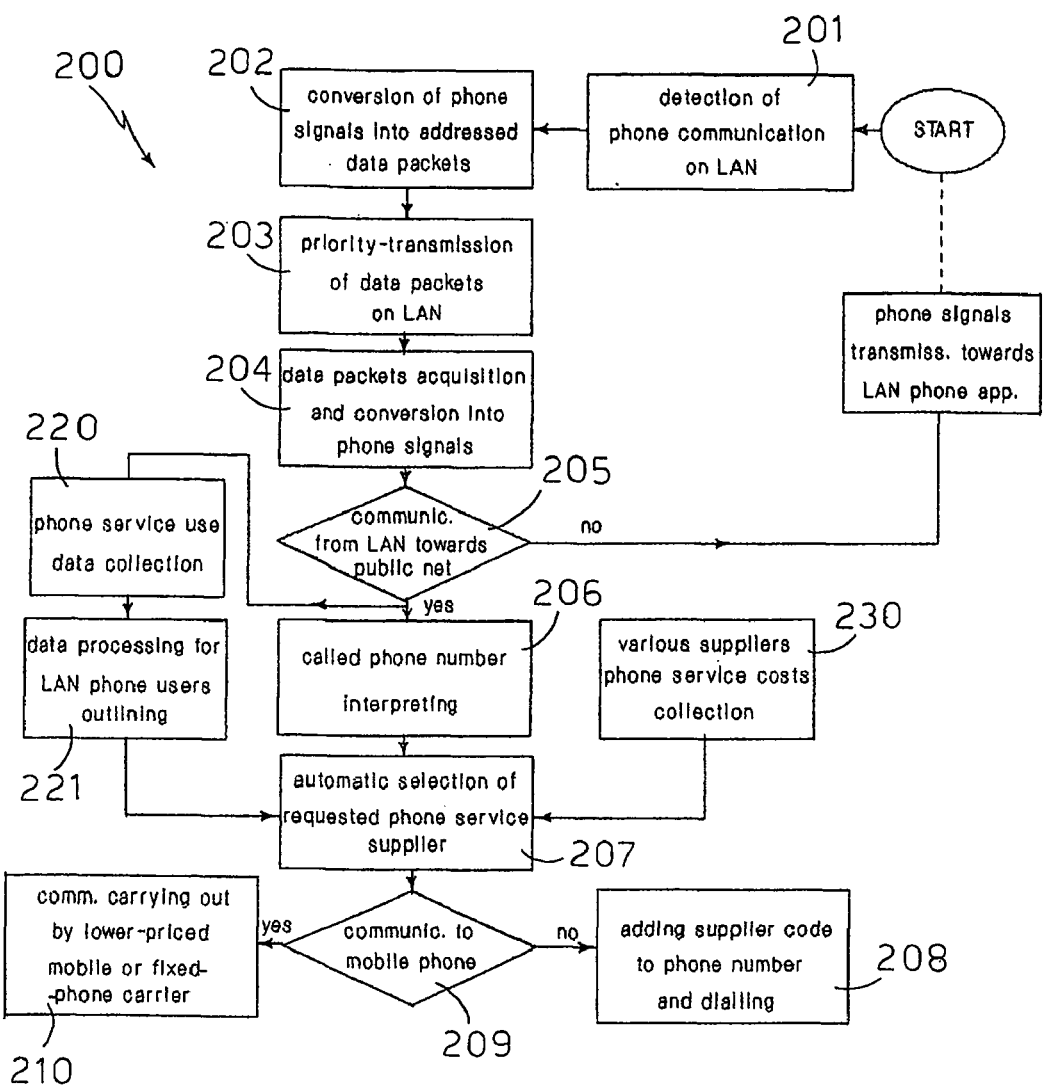
FIGS. 7, 8 and 9 show further detailed flow-charts relating to a method according to the invention.

Flow-chart, 200, of FIG. 7 shows the operating mode of the apparatus when CPU, 53, or other device of the apparatus, detects that the call originating from one of the LAN telephones is directed to a mobile phone, phase 209. In such a case, the call can be made either by the fixed telephone network (PSTN) or throughout mobile telephony means, 22, operating by means of SIM cards managed by the carrier of the called number, phase 210; the choice of either one telephone connection mode or the other one is automatically carried out as a function of the statistic parameters and costs stored in the CPU, 53.

The other steps of the method in FIG. 7, 201-208 and 220, 221 and 230 are exactly the same as the corresponding steps 101-108 and 120, 121 and 130 of the method in FIG. 5.

Figure 8:
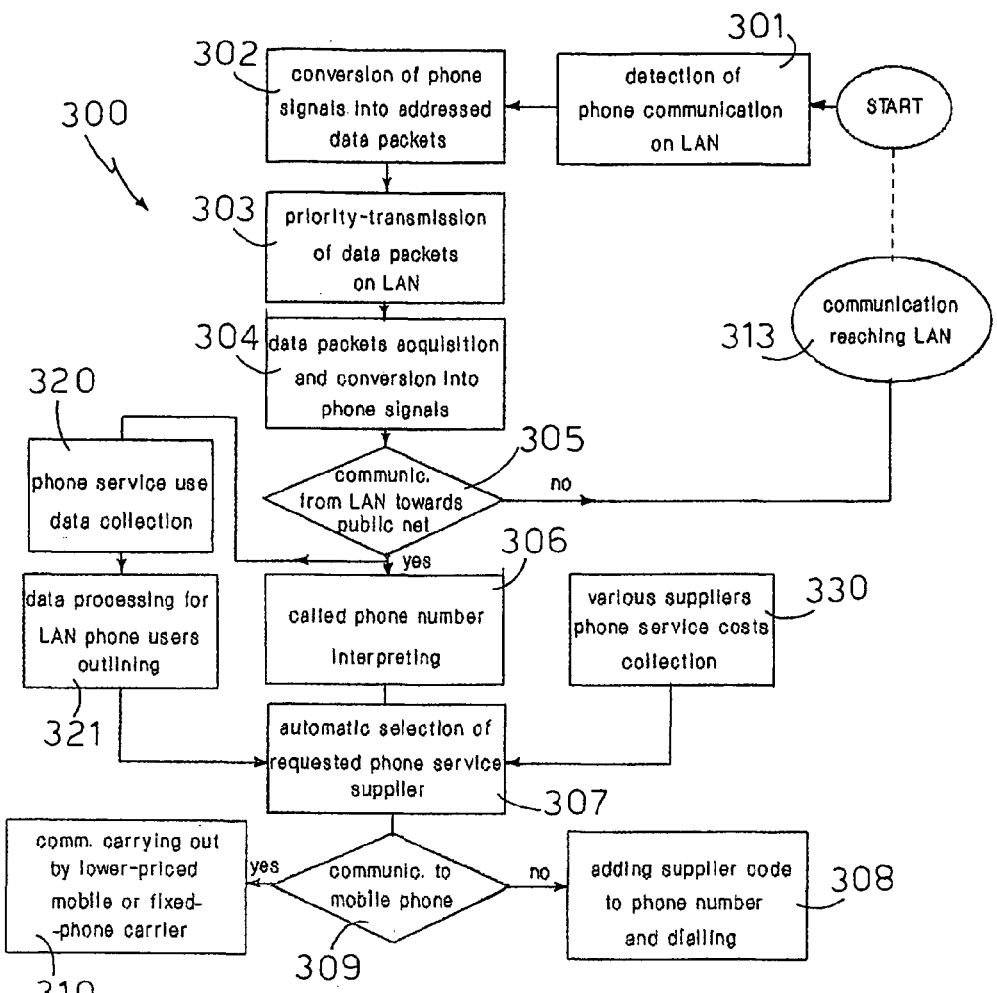
Figure 9:
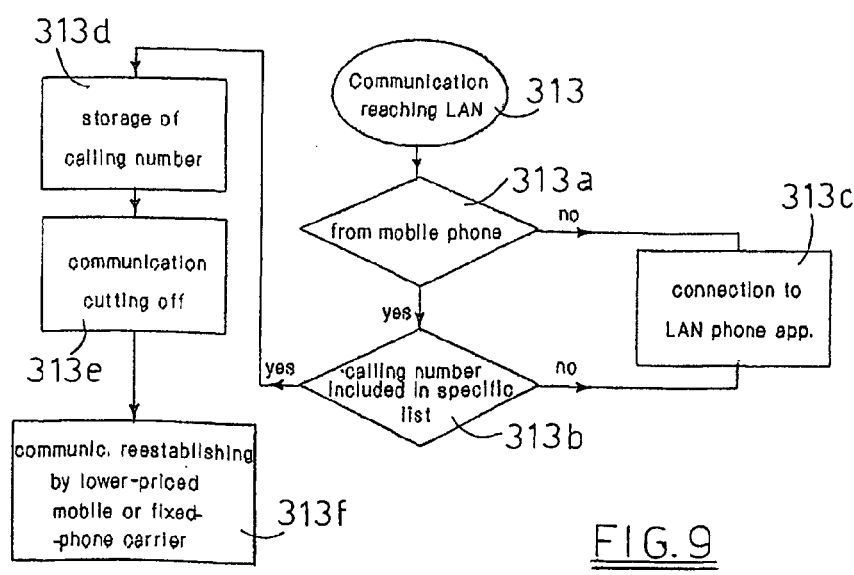

Flow-chart, 300, in FIGS. 8 and 9, shows the operation mode of the apparatus of the invention when CPU, 53, or other apparatus device, detects that a phone communication is coming from well-specfied mobile telephones.

Namely, in case of a communication coming from a mobile phone belonging to one or more groups of mobile phone users entitled to special easy rates, CPU 53, checks the belonging of the calling number to a specific group of numbers and, if so, closes the call and immediately makes a call to the same number choosing the most inexpensive fixed or mobile-telephony carrier.

The above is shown in details in FIG. 9 where, in particular, we can see that the method provides for:

storage of calling number, step 313d, close of call, step 313e, connection to said mobile phone through one of mobile telephony means, 22, located in the transmitting unit 32, step 313f.

Flow-chart of FIG. 9 also shows the decision-making steps 313a and 313b aiming to determine whether the communication is coming or not from a mobile phone belonging to a specific list of telephones, and step 313c of standard connection to a LAN telephone; this latter step occurs according to the detailed flow-chart of FIG. 6b.

The other steps of the method in FIG. 8, 301-308 and 320, 321 and 330 are exactly the same as the corresponding steps 101-108 and 120, 121 and 130 of the method in FIG. 5.

Figure 4:
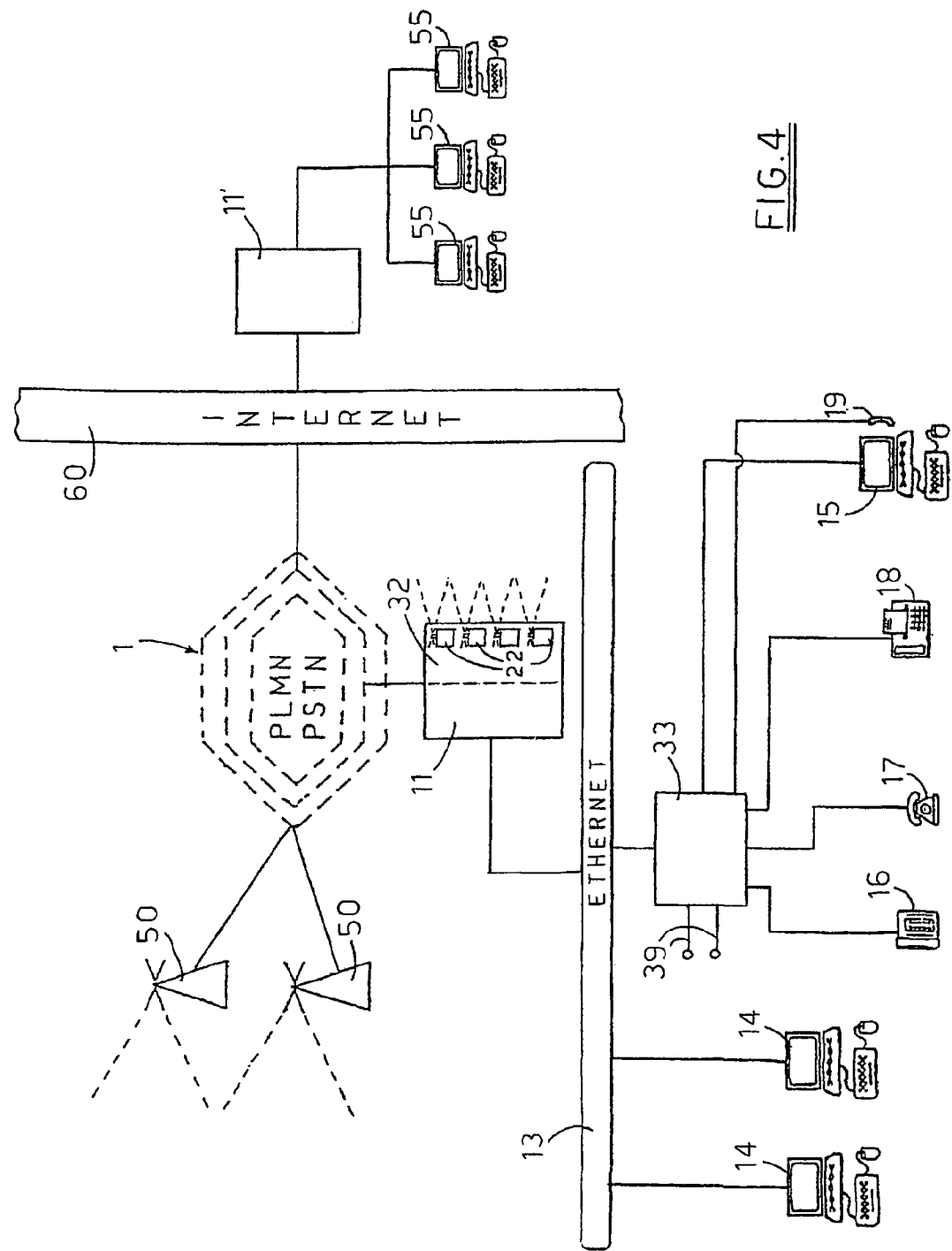
FIG. 4 shows a schematic view of a special embodiment of the apparatus of the invention.

In a particular embodiment of the invention, the processing activities of data referring to the use of telephone services and the activities for the acquisition of data referring to the cost of such services are performed by specific processing units separated from the LAN, 10, and connected to the public telephone network by means of communication networks such as Internet, or the like, as shown in FIG. 4.

Such separated units, schematically shown an marked by 11', are dedicated to acquire cost parameters and to process use statistic parameters relating to groups of users belonging to several local networks. These units periodically connect to central electronic equipments, 11, of said local area networks to receive data concerning the use of telephone services by each phone user of said networks and transmitting to said equipments, 11, parameters useful to automatically selecting the most inexpensive telecommunication carrier and connection mode.

The above separated units, 11', equipped with specific operative terminals, 55, can be located in the management centres of services offered with the apparatus of the invention and, in particular, processing, storing and enquiring services for statistic data filed concerning the use of telephone services by several phone users.

It has to be noticed that, as regards the operative potentialities of the apparatus of this invention, data exchanged between separated units, 11', and electronic equipment, 11, can refer to statistic parameters of a group of phone users or only to cost parameters of telephone services offered by several phone carriers; without any doubt, simplifications can be obtained in both cases as to the overall use of equipment, 11, for the management of local area network.

It is clear that, with the apparatus of this invention, it is possible to get telephony services under the most advantageous conditions obtainable on the market and, furthermore, it is extremely easy to add to a private exchange automatic answer-telephone procedures, additional lines for interfacing with the outside, new internal users and innovative communication mode both internal and external to a local area network.

It has to be noticed that telephones can be integral part of the peripheral workstations (client) of said local area network or can be connected and located at a certain distance from said stations.

It has also to be noticed that the above-described apparatus can involve all or part of the telephones of a body or company and, therefore, can coexist with a traditional telephone system of said body or company.

Characteristics and advantages above described are however save as well as in case of modifications and changes to what has been disclosed by way of example. The present invention should not be construed as limited by such examples, but rather construed according to the following claims.

The invention claimed is:

1. Apparatus for integrating phone communications and IT data transmissions through a local area network (LAN) (10) and for selecting, at the moment of connecting one fixed telephone of said local area network to the public phone network (1), the lowest-prices telecommunication carrier and connection mode, said apparatus comprising:

at least one electronic equipment (11), and related software, which, associated with the central processing unit of said LAN, provides managing the transmission, through the LAN, of both data packets exchanged among the various IT systems of said LAN and data packets referring to phone communications exchanged among the LAN users and among said users and the external telephone network users, and provides, furthermore, at the moment of a call starting from a LAN user, automatically selecting the most inexpensive carrier of the requested telecommunication services, said selection being done according to statistic parameters concerning use of telecommunication services by each single telephone connected to peripheral devices of said LAN and cost parameters of said services; and one or more peripheral devices (33) that provide converting said data packets referring to phone communications into phone signals and sending said phone signals to telephones, faxes, and other phone sets (16, 17, 18, 19) connected to said peripheral devices and also provide, vice-versa, converting phone signals coming from said telephones, faxes or phone receivers into data packets compatible with the transmitting protocol of said LAN (10) and sending said data-packets toward said central electronic equipment (11).

2. Apparatus according to claim 1, wherein said electronic equipment (11) provides for automatically selecting the most inexpensive connection mode between the telephones of said local area network and the external telephone network, and further provides for automatically carrying out said connection.

3. Apparatus according to claim 2, wherein said electronic equipment (11) comprises:
- means (27, 28) for interfacing public telephone network, decadic or multifrequency telephones and terminal devices dedicated to phone operators;
- means (29) for switching ext. telephone lines toward said telephones or toward A/D converters (23), said switching means being automatically controlled according to decoding operations performed on telephone numbers of incoming calls;
- means (31) for storing telephone-answer messages;
- means for priority management of data packets referring to phone communications on said LAN;
- means for generating files of data concerning phone communications through the managed LAN;
- means for storing and processing statistic parameters concerning use of telecommunication services by each single telephone connected to peripheral devices of said LAN;
- means for the acquisition of cost parameters of telecommunication services; and
- means (22) for connecting to external mobile phones and cordless phones associated with LAN telephones;
- said equipment (11) being capable of performing functions of a private exchange, such as the reception of call by local operators, automatic switching of incoming and outgoing phone calls, transmission of hold-on or answer-telephone messages or other similar functions.

4. Apparatus according to claim 1, wherein said peripheral devices (33) comprise:
- means (36) for converting phone signals coming from telephones, faxes or receivers into data compatible with the transmitting protocol of the LAN, and vice-versa;
- means (35, 37) for switching digital data packets coming on the LAN-bus to telephones, faxes and client peripheral computers, connected to such peripheral devices;
- means (34) for decoding the address of said digital data packets; and
- means (38) for detecting the receiver pickup or the enabling of said telephones, faxes or receivers.

5. Apparatus according to claim 4, wherein said peripheral devices (33) comprise d.c. power supplies (40) automatically rechargeable from the a.c. power supply network, said d.c. power supplies being equipped with a battery (41) that provides feeding inner sections of said devices with constant voltage power supply for enough time to make up for any lack of the a.c. network.

6. Apparatus according to claim 4, wherein said means for converting, switching, decoding and detecting, wherein said peripheral devices comprise hard-wired logic circuits or microprocessor units provided with specific software functions.

7. Apparatus according to claim 1, wherein said electronic equipment (11) associated with the LAN server provides to select the carrier of telecommunication services requested by a user of said LAN determining, by detecting and interpreting the digits of the telephone number that said user is calling, the kind of call desired and, selecting the most inexpensive telecommunication carrier according to the type of communication, time of communication, hour cost parameter of said communication and according to user typical parameters specifying the statistically supposed length of said communication, and further provides for automatically dialing the identification code of the selected telecommunication carrier before the telephone number to be called.

8. Apparatus according to claim 2, wherein said central electronic equipment (11), upon the telephone connection of LAN telephones to mobile phones external to said LAN, automatically switches, if cheaper, the type of phone connection, from "fixed to mobile" to "mobile to mobile", using connection means towards the mobile phone network (PLMN) directly included in said equipment or in connected equipments, said connection means operating by means of SIM cards managed by the same mobile phone service carrier who manages the SIM card of the called mobile phone, or by other carrier, if cheaper.

9. Apparatus according to claim 1, comprising specific processing units (11') separated from said LAN (10) and connected to the public telephone network by means of communication networks such as internet, or the like, said separated units (11') being dedicated to acquire cost parameters and to process use statistic parameters relating to groups of users belonging to several local networks, said separated units periodically connecting to the central electronic equipments (11) of said local networks to receive data concerning the use of telephone services by each phone user of said local networks and transmitting to said equipments (11) parameters useful for automatically selecting the most inexpensive telecommunication carrier and connection mode.

10. Apparatus according to claim 9, wherein said central electronic equipments (11) or said separated processing units (11') provide computing different typologies of typical statistic parameters for each one of said users, a first typology referring to average duration of calls made by the single user in different moments of the day and/or during several days of the week or month, a second type referring to the global volume of the telephone traffic going out from said user in a specific period of time, and a third typology referring to the characteristics of the telephone traffic reaching each single user.

11. Method for integrating phone calls and data transmission through a single LAN and for selecting the lowest-prices connection mode and telecommunication service carrier, comprising the steps of:
- detecting phone communications through said local area network (LAN), said communication coming from the public telephone network or from fixed telephones of said LAN;
- converting said phone communication into digital data packets provided with proper addressing;
- priority transmitting said data packets through said LAN;
- acquiring said data packets by a central equipment of said LAN or by peripheral devices associated with the destination telephone sets;
- converting said data packets into phone signals;
- transmitting said phone signals to destination telephone sets or to public phone network, and further comprises when the communication originates from telephones of the local area network and is addressed to the public network:
- detecting and collecting data referring to the use of telecommunication services by each of users, so that, by means of periodical processing activities of said data for calculating use statistic parameters aiming at outlining the users, and by means of periodical acquisitions and storing of cost parameters of the telecommunication services offered by the services carriers, it occurs, upon each call from LAN phones toward public network, detection of digits constituting the telephone number of said call;

determination, as a function of said digits, of the type of the telecommunication service that user is requesting;

selection, as a function of the above statistic parameters and above cost parameters, of the lowest-prices telecommunication carrier and connection mode for carrying out the telecommunication service requested by the user; and automatic dialling of the identification code of said carrier before the telephone number of said call and, according to the telephone connection mode selected in accordance with the previous step, the transmission of said call by means of fixed phones or mobile phones.

12. Method according to claim 11, wherein, in case a fixed telephone gets a phone call by mobile telephones, comprises the steps of:

detecting the caller's telephone number;

checking the inclusion of said number in a determined list of numbers; and, if so:

storing said number, refusing the incoming phone call, and calling said telephone number using, according to the inexpensiveness, fixed phones or mobile phones including SIM identification cards managed by the same mobile service earner who manages the identification card of the mobile phone receiving the call.

13. Method according to claim 11 wherein, in case the addressed telephone number of a communication reaching said LAN from the external telephone network does not include any in-LAN phone user number, the communication is managed by Interactive terminal operators (20) of a central managing unit of said LAN, said operators being capable of writing real time e-mail messages, giving communication multimedia contents, recording voice messages, forwarding communications to the LAN users or performing other operations.

14. Method according to claim 11, wherein, in case the addressed telephone number of a communication reaching said LAN from the external telephone network does not include any in-LAN phone user number, said communication is switched by a central managing unit of said LAN to one of the telephone sets (21) connected to said unit, without converting the communication into digital form, the A/D conversion being performed if said communication is subsequently forwarded to one of said LAN phone users.

15. Apparatus for integrating phone communications and IT data transmissions through a local area network (LAN) (10) and for selecting, at the moment of connecting one fixed telephone of said local area network to the public phone network (1), the lowest-prices telecommunication carrier and connection mode, said apparatus comprising:

at least one electronic equipment (11), and related software, which, associated with the central processing unit of said LAN, provides managing the transmission, through the LAN, of both data packets exchanged among the various IT systems of said LAN and data packets referring to phone communications exchanged among the LAN users and among said users and the external telephone network users, and provides, furthermore, at the moment of a call starting from a LAN user, automatically selecting the most inexpensive carrier of the requested telecommunication services, said selection being done according to specific parameters of said user and cost parameters of said services; and one or more peripheral devices (33) that provide converting said data packets referring to phone communications into phone signals and sending said phone signals to telephones, faxes, and other phone sets (16, 17, 18, 19) connected to said peripheral devices and also provide, vice-versa, converting phone signals coming from said telephones, faxes or phone receivers into data packets compatible with the transmitting protocol of said LAN (10) and sending said data-packets toward said central electronic equipment (11), wherein, said electronic equipment (11) comprises:

means (27, 28) for interfacing public telephone network, decadic or multifrequency telephones and terminal devices dedicated to phone operators;

means (29) for switching ext. telephone lines toward said telephones or toward A/D converters (23), said switching means being automatically controlled according to decoding operations performed on telephone numbers of incoming calls;

means (31) for storing telephone-answer messages;

means for priority management of data packets referring to phone communications on said LAN;

means for generating files of data concerning phone communications through the managed LAN;

means for storing and processing statistic parameters concerning use of telecommunication services by each single telephone connected to peripheral devices of said LAN;

means for the acquisition of cost parameters of telecommunication services; and means (22) for connecting to external mobile phones and cordless phones associated with LAN telephones, said equipment (11) being capable of performing functions of a private exchange, such as the reception of call by local operators, automatic switching of incoming and outgoing phone calls, transmission of hold-on or answer-telephone messages or other similar functions.

16. Apparatus for integrating phone communications and IT data transmissions through a local area network (LAN) (10) and for selecting, at the moment of connecting one fixed telephone of said local area network to the public phone network (1), the lowest-prices telecommunication carrier and connection mode, said apparatus comprising:

at least one electronic equipment (11), and related software, which, associated with the central processing unit of said LAN, provides managing the transmission, through the LAN, of both data packets exchanged among the various IT systems of said LAN and data packets referring to phone communications exchanged among the LAN users and among said users and the external telephone network users, and provides, furthermore, at the moment of a call starting from a LAN user, automatically selecting the most inexpensive carrier of the requested telecommunication services, said selection being done according to statistic parameters concerning use of telecommunication services by each single telephone connected to peripheral devices of said LAN and cost parameters of said services; and one or more peripheral devices (33) that provide converting said data packets referring to phone communications into phone signals and sending said phone signals to telephones, faxes, and other phone sets (16, 17, 18, 19) connected to said peripheral devices and also provide, vice-versa, converting phone signals coming from said telephones, faxes or phone receivers into data packets compatible with the transmitting protocol of said LAN (10) and sending said data-packets toward said central electronic equipment (11), wherein said electronic equipment (11) provides for automatically selecting the most inexpensive connection mode between the telephones of said local area network and the external telephone network, and further provides for automatically carrying out said connection and, wherein said central electronic equipment (11), upon the telephone connection of LAN telephones to mobile phones external to said LAN, automatically switches, if cheaper, the type of phone connection, from "fixed to mobile" to "mobile to mobile", using connection means towards the mobile phone network (PLMN) directly included in said equipment or in connected equipments, said connection means operating by means of SIM cards managed by the same mobile phone service carrier who manages the SIM card of the called mobile phone, or by other carrier, if cheaper.

17. Apparatus for integrating phone communications and IT data transmissions through a local area network (LAN) (10) and for selecting, at the moment of connecting one fixed telephone of said local area network to the public phone network (1), the lowest-prices telecommunication carrier and connection mode, said apparatus comprising:

at least one electronic equipment (11), and related software, which, associated with the central processing unit of said LAN, provides managing the transmission, through the LAN, of both data packets exchanged among the various IT systems of said LAN and data packets referring to phone communications exchanged among the LAN users and among said users and the external telephone network users, and provides, furthermore, at the moment of a call starting from a LAN user, automatically selecting the most inexpensive carrier of the requested telecommunication services, said selection being done according to statistic parameters concerning use of telecommunication services by each single telephone connected to peripheral devices of said LAN and cost parameters of said services;

one or more peripheral devices (33) that provide converting said data packets referring to phone communications into phone signals and sending said phone signals to telephones, faxes, and other phone sets (16, 17, 18, 19) connected to said peripheral devices and also provide, vice-versa, converting phone signals coming from said telephones, faxes or phone receivers into data packets compatible with the transmitting protocol of said LAN (10) and sending said data-packets toward said central electronic equipment (11); and specific processing units (11') separated from said LAN (10) and connected to the public telephone network by means of communication networks such as internet, or the like, said separated units (11') being dedicated to acquire cost parameters and to process use statistic parameters relating to groups of users belonging to several local networks, said separated units periodically connecting to the central electronic equipments (11) of said local networks to receive data concerning the use of telephone services by each phone user of said local networks and transmitting to said equipments (11) parameters useful for automatically selecting the most inexpensive telecommunication carrier and connection mode.

18. Apparatus according to claim 17, wherein said central electronic equipments (11) or said separated processing units (11') provide computing different typologies of typical statistic parameters for each one of said users, a first typology referring to average duration of calls made by the single user in different moments of the day and/or during several days of the week or month, a second type referring to the global volume of the telephone traffic going out from said user in a specific period of time, and a third typology referring to the characteristics of the telephone traffic reaching each single user.

* * * * *